(12) United States Patent
Wirachowski et al.

(10) Patent No.: US 11,047,461 B2
(45) Date of Patent: Jun. 29, 2021

(54) TORQUE TRANSMISSION ASSEMBLY

(71) Applicant: ZF Friedrichshafen AG, Friedrichshafen (DE)

(72) Inventors: Michael Wirachowski, Wuerzburg (DE); Sebastian Neugebauer, Schweinfurt (DE); Andreas Orlamünder, Schonungen (DE); Christoph Sasse, Schweinfurt (DE); Christoph Fauss, Werneck (DE); Stefan Herzog, Coburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/478,158

(22) PCT Filed: Dec. 18, 2017

(86) PCT No.: PCT/EP2017/083217
§ 371 (c)(1),
(2) Date: Jul. 16, 2019

(87) PCT Pub. No.: WO2018/134011
PCT Pub. Date: Jul. 26, 2018

(65) Prior Publication Data
US 2019/0359049 A1    Nov. 28, 2019

(30) Foreign Application Priority Data

Jan. 18, 2017 (DE) .................. 10 2017 200 765.6
Feb. 13, 2017 (DE) .................. 10 2017 202 196.9

(51) Int. Cl.
*F16H 45/02* (2006.01)
*B60K 6/48* (2007.10)
*F16H 41/24* (2006.01)

(52) U.S. Cl.
CPC ...... *F16H 45/02* (2013.01); *B60K 2006/4825* (2013.01); *F16H 2041/243* (2013.01);
(Continued)

(58) Field of Classification Search
CPC ............... F16H 45/02; F16H 2045/021; F16H 2045/0221; F16H 2045/0252; F16H 2045/0284; B60K 2006/4825
See application file for complete search history.

(56) References Cited

U.S. PATENT DOCUMENTS 8,585,541 B2    11/2013  Mueller
8,708,116 B2    4/2014   Miyahara
(Continued)

FOREIGN PATENT DOCUMENTS

DE  102004004176         8/2005
DE  102004004176 A1  *  8/2005  ............. F16H 45/02
(Continued)

*Primary Examiner* — David R Morris
(74) *Attorney, Agent, or Firm* — Cozen O'Connor (57) ABSTRACT

A torque transmission assembly (20) for a drive system of a vehicle, includes a housing (26), an input-side friction surface arrangement which is coupled to the housing (26) for corotation around a rotational axis (A), an output-side friction surface arrangement which is coupled to a drive member (36) for corotation around the rotational axis (A) and a deflection mass arrangement (50) with a deflection mass carrier (52) and at least one deflection mass (54) supported at the deflection mass carrier (52) and which can be deflected from a basic relative position with respect to the deflection mass carrier (52). The torque transmission assembly (20) does not comprise a torsional vibration damper arrangement, and/or the deflection mass carrier (52) is connected to the housing (26) so as to be fixed with respect to rotation relative to the housing for corotation around the rotational axis (A).

19 Claims, 7 Drawing Sheets

(52) U.S. Cl.
CPC ............... *F16H 2045/0252* (2013.01); *F16H 2045/0284* (2013.01)

(56) References Cited

U.S. PATENT DOCUMENTS

| | | | | |
|---|---|---|---|---|
| 10,393,223 | B2* | 8/2019 | Hertel | ................ F16D 25/0635 |
| 2011/0154944 | A1* | 6/2011 | Mueller | ................ B60K 6/405 |
| | | | | 74/665 A |
| 2017/0219048 | A1* | 8/2017 | Hertel | ................ F16F 15/1421 |

FOREIGN PATENT DOCUMENTS

| | | | |
|---|---|---|---|
| DE | 102010015431 | 11/2010 | |
| DE | 102013225601 | 12/2012 | |
| DE | 102014221573 | 5/2015 | |
| EP | 2600031 | 6/2013 | |
| EP | 2706260 | 3/2014 | |
| EP | 2743541 | 6/2014 | |
| EP | 2706260 B1 * | 7/2019 | ............ F16D 13/58 |
| WO | WO2015192842 | 12/2015 | |

\* cited by examiner

TORQUE TRANSMISSION ASSEMBLY

PRIORITY CLAIM

This is a U.S. national stage of application No. PCT/EP2017/083217, filed on Dec. 18, 2017. Priority is claimed on the following application: Country: Germany, Application No.: 10 2017 200 765.6, filed: Jan. 18, 2017 and Country: Germany, Application No.: 10 2017 202 196.9, filed: Feb. 13, 2017, the content of which is/are incorporated herein in its entirety by reference.

FIELD OF THE INVENTION

The invention is directed to a torque transmission assembly for a drive system of a vehicle, comprising a housing, an input-side friction surface arrangement which is coupled to the housing for corotation around a rotational axis, an output-side friction surface arrangement which is coupled to a drive member for corotation around the rotational axis and which can be brought into frictional engagement with the input-side friction surface arrangement, and a deflection mass arrangement with a deflection mass carrier and at least one deflection mass which is supported at the deflection mass carrier and which can be deflected from a basic relative position with respect to the deflection mass carrier.

BACKGROUND OF THE INVENTION

A torque transmission assembly which is constructed as wet clutch and in which a torsional vibration damper arrangement and a deflection mass arrangement are provided is known from DE 10 2013 225 601 A1.

DE 11 2010 005 938 T5 discloses a hydrodynamic torque converter in which a torsional vibration damper arrangement and a deflection mass arrangement arranged in the torque flow following a lockup clutch are associated with the hydrodynamic torque converter.

WO 2015/192842 A1 discloses a wet multiple-plate clutch with a deflection mass arrangement provided in the torque flow following plates which provide the respective friction surface arrangements.

It is an object of the invention to construct a torque transmission assembly in such a way that it is contributes to a simplified construction of a drive system accompanied by improved vibration damping characteristic.

SUMMARY OF THE INVENTION

This object is met according to the invention by a torque transmission assembly for a drive system of a vehicle, comprising a housing, an input-side friction surface arrangement which is coupled to the housing for corotation around a rotational axis, an output-side friction surface arrangement which is coupled to a drive member for corotation around the rotational axis and which can be brought into frictional engagement with the input-side friction surface arrangement, and a deflection mass arrangement with a deflection mass carrier and at least one deflection mass which is supported at the deflection mass carrier and which can be deflected from a basic relative position with respect to the deflection mass carrier. The torque transmission assembly does not comprise a torsional vibration damper arrangement, and/or the deflection mass carrier is connected to the housing so as to be fixed with respect to rotation relative to it for corotation around the rotational axis.

A compactly designed torque transmission assembly is realized with the construction according to the invention, in which it is ensured particularly by coupling the deflection mass arrangement to the housing, i.e., in an area in the torque flow upstream of the friction surface arrangements, that the deflection mass arrangement remains tuned, for example, to a predetermined order of an exciting vibration, and a detuning and, therefore, impairment of the damping capacity is prevented. A further contribution to the elimination of vibrations can be provided at the same time particularly when the friction surface arrangements work in slip mode.

For a construction that can be realized in a simple manner, the housing can comprise at least two housing parts which are connected to one another preferably by welding and in which it can further be provided that the deflection mass carrier is connected to one of the housing parts so as to be fixed with respect to rotation relative to it, and/or in that the deflection mass carrier is connected to the housing so as to be fixed with respect to rotation and/or axially fixed relative to it in the area where two housing parts adjoin one another.

Regardless of the constructional configuration of the housing itself, a compact construction can be obtained, particularly when there is installation space available in the housing of the torque transmission assembly when no torsional vibration damper arrangement is present, in that the deflection mass arrangement is arranged in the interior of the housing.

In order to obtain a connection of the deflection mass carrier to the housing that is stable and, at the same time, simple to implement, the torque transmission assembly can be configured such that the deflection mass carrier is connected to the housing so as to be fixed with respect to rotation relative to it by riveting, by welding or by toothed engagement, and/or in that the deflection mass carrier is connected to the housing so as to be fixed with respect to rotation relative to it by welding, and/or in that the deflection mass carrier is connected to the housing so as to be fixed with respect to rotation relative to it via a coupling element, and the deflection mass carrier is preferably connected to the coupling element so as to be fixed with respect to rotation relative to it by riveting and/or the coupling element is connected to the housing so as to be fixed with respect to rotation relative to it by welding or toothed engagement, and/or in that the deflection mass carrier is connected to the housing so as to be fixed with respect to rotation relative to it by toothed engagement and/or by pressing in.

The axial coupling of the deflection mass carrier to the housing can preferably be achieved in that the deflection mass carrier is supported in axial direction at an end face of at least one of the two housing parts, which end face is provided in the area where the two housing parts adjoin one another, and/or in that a coupling element which couples the deflection mass carrier to the housing such that they are fixed with respect to rotation relative to one another is supported with respect to the housing in at least one axial direction.

In a configuration which is particularly advantageous with respect to the action of a deflection mass arrangement, it can be provided that there is no deflection mass arrangement provided following the friction surface arrangements in the torque flow. By arranging a deflection mass arrangement exclusively upstream of the friction surface arrangements in the torque flow, a detuning of the deflection mass arrangement which is generally tuned to an excitation order of a vibration can be prevented.

It should be noted in this connection that, within the meaning of the invention, arrangement in the torque flow upstream of the friction surface arrangements refers to the torque flow in driving state from a drive unit via the torque transmission assembly into, e.g., a transmission.

In an alternative construction type, it can be provided that the deflection mass carrier is connected to the output member so as to be fixed with respect to rotation relative to it for corotation around the rotational axis.

For a reliable transmission of even comparatively large torques, it can be provided according to the invention that the input-side friction surface arrangement comprises a plurality of input-side friction elements which are coupled to the housing for corotation around the rotational axis, in that the output-side friction surface arrangement comprises a plurality of output-side friction elements which are coupled to an output-side friction element carrier for corotation around the rotational axis, and in that a pressing element is provided for pressing the input-side friction elements and the output-side friction elements against one another.

The torque transmission assembly may be, for example, a hydrodynamic torque converter with an impeller which is rotatable with the housing around the rotational axis, a turbine which is arranged in the housing and connected to the output member for corotation around the rotational axis, and a stator.

In an alternative construction type, the torque transmission assembly can be a wet clutch.

The invention is further directed to a drive system comprising a dual mass flywheel with a primary side which is to be coupled to, or which is coupled to, a drive unit and with a secondary side which is coupled to the primary side via a damper element arrangement for torque transmission, and a torque transmission assembly constructed according to the invention, in which the housing of the torque transmission assembly is coupled to the secondary side of the dual mass flywheel for corotation around the rotational axis.

Further, an electric machine with a stator arrangement and a rotor arrangement which is coupled to the secondary side of the dual mass flywheel and to the housing of the torque transmission assembly for corotation around the rotational axis can be integrated in the drive system according to the invention.

In a drive system of this type and a drivetrain constructed with the latter, there is preferably no deflection mass arrangement provided in the torque flow following the friction surface arrangements.

BRIEF DESCRIPTION OF THE DRAWINGS

The invention will be described in more detail in the following with reference to the accompanying drawings in which.

DETAILED DESCRIPTION OF THE PRESENTLY PREFERRED EMBODIMENTS

Figure 1:
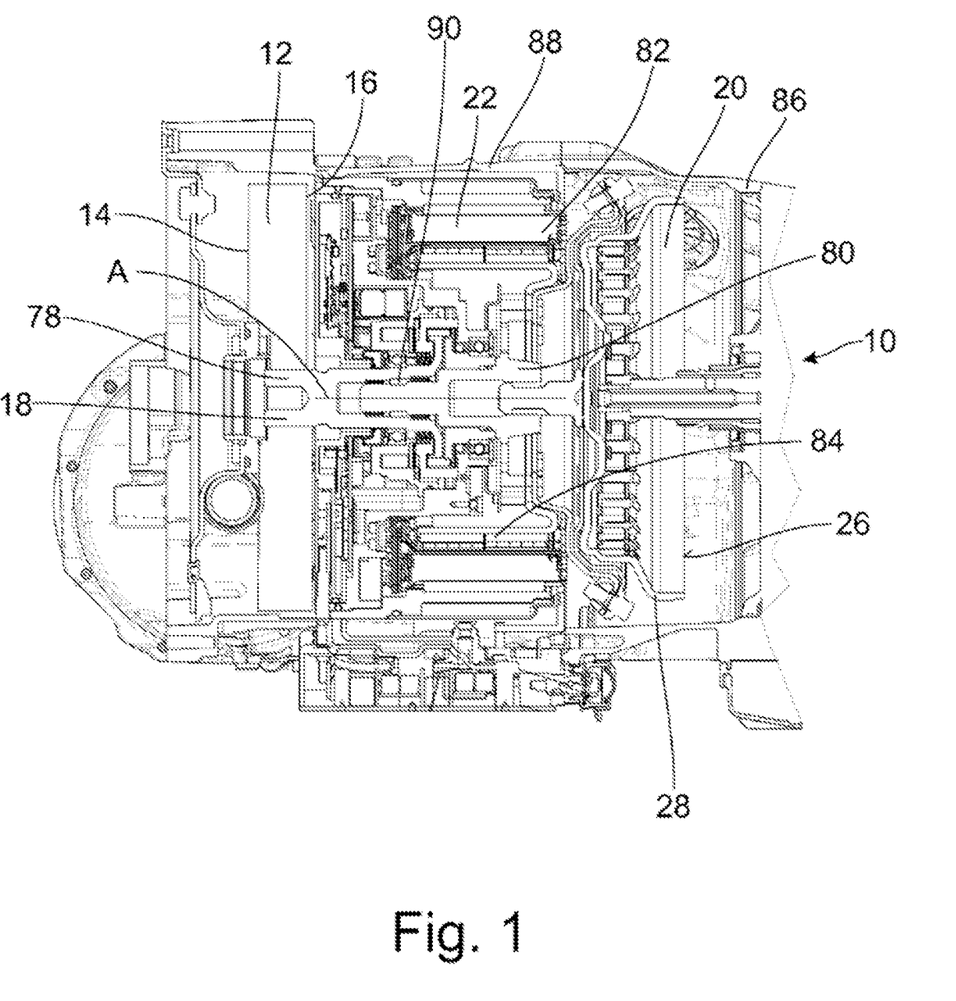
FIG. 1 is a cross-sectional view of a drive system with a dual mass flywheel, an electric machine and a torque transmission assembly constructed as hydrodynamic torque converter.

In FIG. 1, a drive system which can be used in the drivetrain of a vehicle is generally indicated at 10. The drive system 10 comprises a dual mass flywheel 12 which can be coupled to a drive unit, for example, a crankshaft of an internal combustion engine, by a primary side 14, shown only indicatively in the drawing. The secondary side, likewise shown only indicatively in the drawing, of the dual mass flywheel 12 is coupled to the primary side 14 via a plurality of damper elements, for example, damper springs, for transmitting torque. The secondary side 16 is coupled via a coupling shaft arrangement 18 to a torque transmission assembly, generally indicated at 20, for corotation around a rotational axis A. As will be described in the following, the torque transmission assembly 20 can act as a starting element so as to interrupt or establish torque flow in a drivetrain. The coupling shaft arrangement 18 can comprise, for example, a first coupling shaft 78 which is coupled to the secondary side 16 of the dual mass flywheel so as to be fixed with respect to rotation relative to it and a second coupling shaft 80 which is coupled to the torque transmission assembly 20 so as to be fixed with respect to rotation relative to it. The two coupling shafts 78, 80 can be inserted axially one inside the other and coupled to one another selectively for corotation through a coupling arrangement 90, for example, a dog clutch.

A rotor arrangement 82 of an electric machine, generally indicated at 22, is connected to the second coupling shaft 80. The stator arrangement 84 of the electric machine 22 is supported at a stationary assembly, for example, a housing 88 which surrounds the electric machine 22 and which is arranged adjacent to the transmission housing 86.

If a torque is to be transmitted from a drive unit, i.e., for example, an internal combustion engine, to the torque transmission assembly 20 via the dual mass flywheel 12, the two coupling shafts 78, 80 are coupled to one another for corotation through the coupling arrangement 90. In this state, the electric machine 22 can supply an auxiliary torque. If a vehicle is to be operated purely in electric motor mode, the two coupling shafts 78, 80 can be decoupled from one another so that the dual mass flywheel 12 and the drive unit connected to the latter are decoupled from the subsequent portion of the drivetrain, and the electric machine 22 introduces all of the drive torque into the drivetrain via the coupling shaft 80 and the torque transmission assembly 20.

Figure 2:
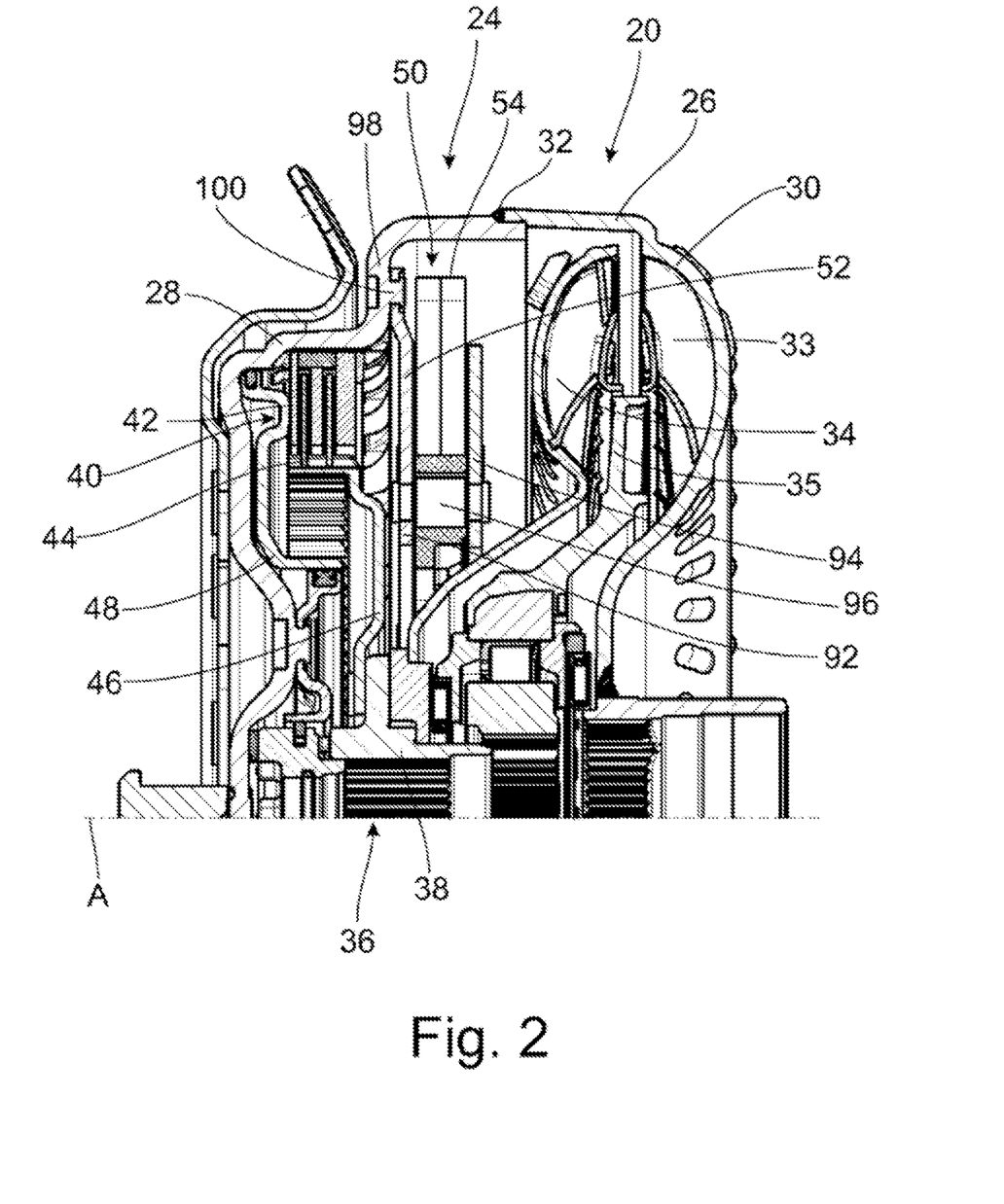
FIG. 2 is a fragmentary longitudinal section of a first construction type of a torque transmission assembly with a deflection mass arrangement.

The torque transmission assembly 20 which is shown in detail in FIG. 2 is constructed in this embodiment example in the form of a hydrodynamic torque converter 24. The torque transmission assembly 20 comprises a housing 26 which is filled or fillable with fluid, e.g., oil, and which has two shell-shaped housing parts 28, 30. The latter are fixedly connected to one another in their radially outer area by welding 32. In the drive system 10 shown in FIG. 1, the housing part 28 is coupled to the secondary side 16 of the dual mass flywheel 12 via the coupling shaft arrangement 18 and is accordingly connected to the secondary side 16 so as to be substantially fixed with respect to rotation relative to it for corotation around the rotational axis A. An impeller, generally indicated at 33, with a plurality of circumferentially successive impeller blades is provided at the housing 26. A turbine 34 with a plurality of circumferentially successive turbine blades is provided in the interior of housing 26 and is connected to a hub 38 acting as output member 36 so as to be fixed with respect to rotation relative to it. A stator 35 with a plurality of circumferentially successive stator vanes is located between the impeller 33 and the turbine 34 in the radially inner area.

Together with a plurality of input-side friction elements 42, also known generally as plates, a lockup clutch, generally indicated at 40, provides an input-side friction surface arrangement. The input-side friction elements 42 are coupled in the radially outer area thereof to the housing part 28 of housing 26 by a toothed engagement for corotation around the rotational axis A. A plurality of output-side friction elements 44 provides an output-side friction surface arrangement, the output-side friction elements 44 being coupled in their radially inner area by toothed engagement to an output-side friction element carrier 46 for corotation around the rotational axis A. The output-side friction element carrier 46 is connected to the hub 38 acting as output member 36 so as to be fixed with respect to rotation relative to it.

In order to connect the housing 26 to the output member 36, i.e., hub 38, for transmitting torque, the input-side friction elements 42 and output-side friction elements 44 which are alternately successively arranged in direction of the rotational axis A are pressed against one another by a clutch piston which is provided in housing 26, can be acted upon by pressurized fluid and acts as pressing element 48.

Further, a deflection mass arrangement 50, also generally known as speed-adaptive damper, is provided in housing 26. This deflection mass arrangement 50 comprises a deflection mass carrier 52 at which a plurality of deflection masses 54 are supported circumferentially successively around the rotational axis A such that in rotational state they are preloaded radially outward in a basic relative position with respect to the deflection mass carrier 52 contingent upon centrifugal force and, when rotational irregularities occur, are deflected in circumferential direction out of the basic relative position with respect to the deflection mass carrier 52 and, in so doing, are impelled radially inward, i.e., toward the rotational axis A.

The deflection mass carrier 52 comprises two disks 92, 94 which are fixedly connected to one another, e.g., by riveting, the deflection masses 54 being received axially therebetween. Every deflection mass 54 is coupled to the deflection mass carrier 52 via at least two guide pins 96. Associated with each guide pin 96, a curved guide path with a vertex area is provided in each instance at the deflection masses 54 and disks 92, 94. The guide paths in the deflection masses 54 have in each instance a radially inner vertex area, and the guide paths in disks 92, 94 have a radially outer vertex area in each instance. Under centrifugal force, the deflection masses 54 are displaced into the basic relative position with respect to the deflection mass carrier 52 at a maximum distance from rotational axis A so that the guide pins 96 are located in the vertex areas of the guide paths cooperating respectively with these vertex areas. When torsional vibrations occur, the deflection masses 54 are accelerated or moved in circumferential direction with respect to deflection mass carrier 52 so that the guide pins 96 move along the radially outwardly curved guide paths in the deflection masses 54 and along the radially inwardly curved guide paths in disks 92, 94 and accordingly impel the deflection masses radially inward in centrifugal potential.

In the depicted embodiment, the deflection mass carrier 52 is connected to the housing part 28 of housing 26 so as to be fixed with respect to rotation relative to it by riveting. Accordingly, the deflection mass arrangement 50 is arranged upstream of lockup clutch 42 in the torque flow with respect to a drive state in which a torque is transmitted from a drive unit via the drive system 10 of FIG. 1 to driven wheels.

For the riveted connection, integrally formed rivets 100 are provided at housing part 28 in a radially outwardly extending wall area 98 radially outwardly of lockup clutch 40 and are guided through associated openings in the disk 92 of deflection mass carrier 52 and deformed. In this way, openings in housing 26 leading to leakiness can be avoided.

It will be appreciated from FIG. 2 that the torque transmission assembly 20 does not have any torsional vibration damper arrangement in the torque transmission assembly 20 according to the invention or in a drive system 10 comprising this torque transmission assembly 20. It is noted in this regard that a torsional vibration damper arrangement in this sense is an assembly which comprises a primary side and a secondary side and a damper element arrangement, e.g., a plurality of springs, coupling the primary side to the secondary side so that a torque can be transmitted via this assembly and torsional vibrations can be damped through deformation of the damper elements of the damper element arrangement. Since a torsional vibration damper arrangement of this kind is not provided in the torque transmission assembly 20 itself in the construction of a torque transmission assembly 20 according to the invention, there is sufficient installation space for a deflection mass arrangement 50 which, on principle, is not situated in the torque flow, i.e., does not transmit torque. The construction of the torque transmission assembly 20 is therefore comparatively simple. In the construction of a drive system 10 according to the invention, the dual mass flywheel 12 located in the torque flow upstream of the torque transmission assembly 20 with respect to a drive state takes over the damping action which is provided in principle by a torsional vibration damper arrangement.

Figure 3:
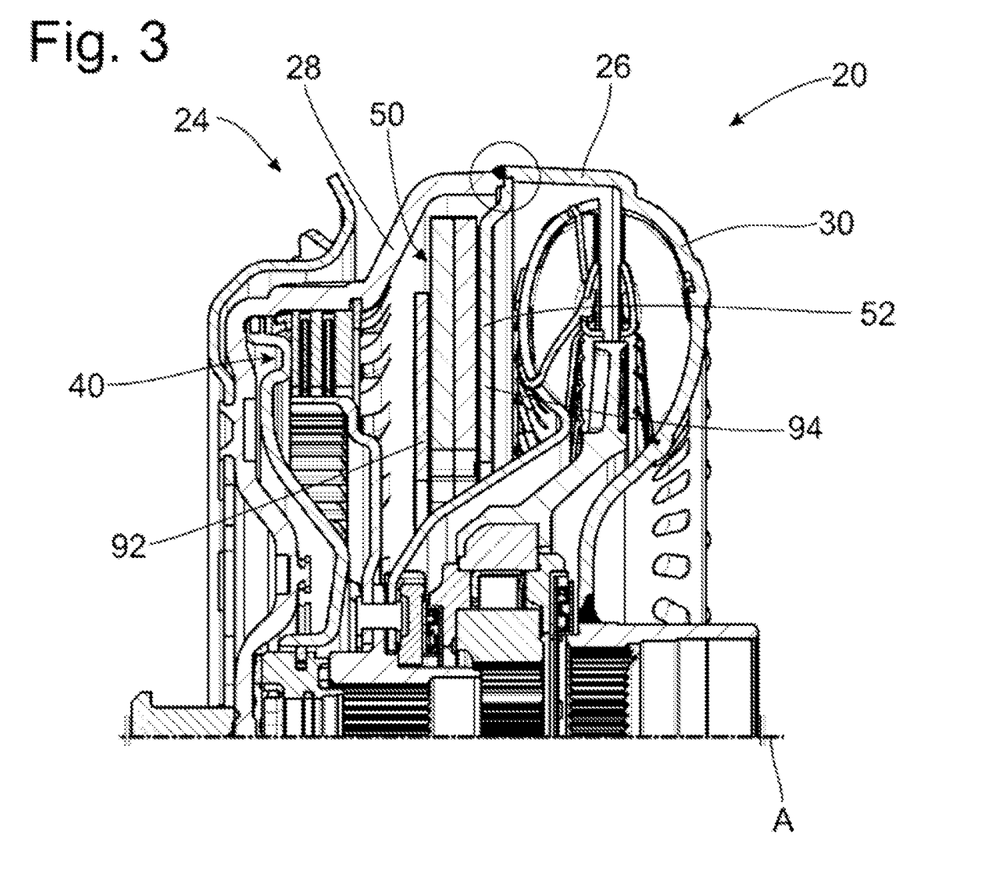
FIG. 3 is a view corresponding to FIG. 2 of an alternative construction type of a torque transmission assembly.
Figure 4:
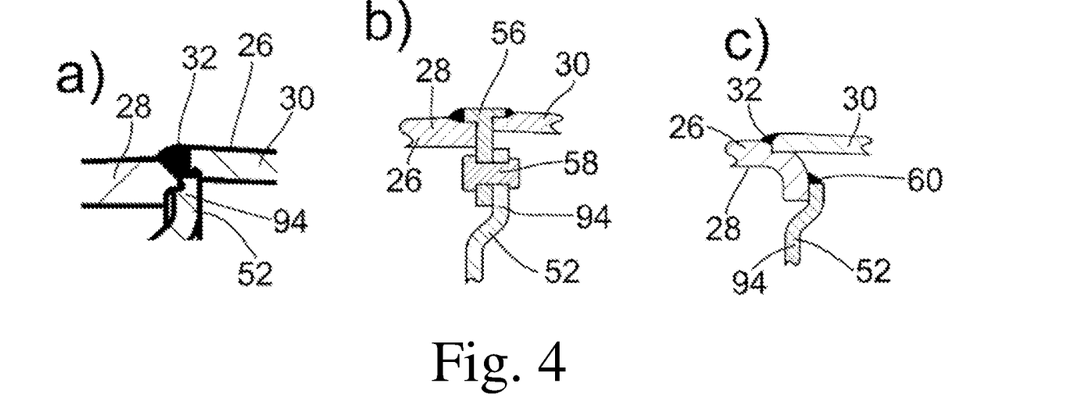
FIG. 4A is a view of different type of connection of a deflection mass carrier to a housing of the torque transmission assembly of FIG. 3.
FIG. 4B is a view of different type of connection of a deflection mass carrier to a housing of the torque transmission assembly of FIG. 3.
FIG. 4C is a view of different type of connection of a deflection mass carrier to a housing of the torque transmission assembly of FIG. 3.

An alternative way of connecting the deflection mass arrangement 50 to the housing 26 is shown in FIGS. 3 and 4. It will be appreciated from FIGS. 3 and 4A that the deflection mass carrier 52 is connected to the two housing parts 28, 30 in an area where the two housing parts 28, 30 adjoin one another. FIG. 4A shows that the deflection mass carrier 52 is connected by its disk 94 in its radially outer area to the two housing parts 28, 30 by welding, for example, by welding 32, via which the two housing parts 28, 30 are connected to one another. FIG. B4 shows the use of a coupling element 56 which is positioned between the two housing parts 28, 30 in the area where the latter adjoin one another and is connected to both housing part 28 and housing part 30 by welding. The annular coupling element 56 which is provided with a generally T-shaped cross-sectional structure extends radially inward and is connected in its area located inside of the housing 26 to the deflection mass carrier 52, particularly disk 94, so as to be fixed with respect to rotation relative to it, for example, by a plurality of rivet pins 58. FIG. 4C shows a configuration in which housing part 28 is deformed radially inward in its area adjoining housing part 30. In this area which is deformed radially inward, the deflection mass carrier 52 is connected by its disk 94 to housing part 28 so as to be fixed with respect to rotation relative to it by welding 60, for example, a plurality of circumferentially successive spot welds or a circumferentially extending weld seam.

Figure 5:
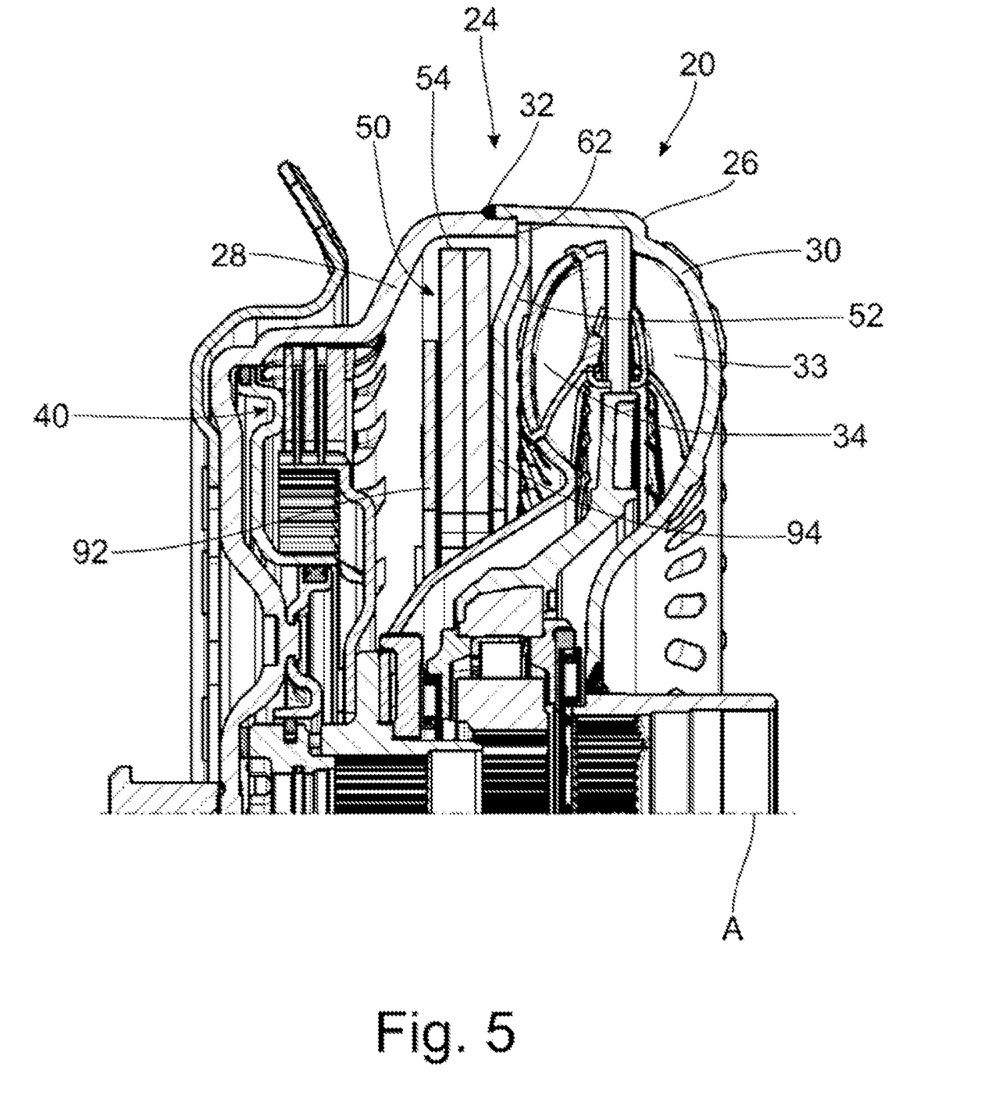
FIG. 5 is a further view corresponding to FIG. 2 of an alternative construction type of a torque transmission assembly.

FIG. 5 shows a construction type in which the deflection mass carrier is arranged in the area where the two housing parts 28, 30 adjoin one another, axially following housing part 28 and inside of housing part 30. The deflection mass carrier 52 is pressed, for example, by its disk 94, into the housing part 30 which, for example, is conically shaped in its radially outer area. When the two housing parts 28, 30 move toward one another, the deflection mass carrier 52 comes in axial contact with an end face 62 of housing part 28 and is accordingly fixed with respect to rotation, and also axially, relative to the housing 26 in that it is pressed into housing part 30 on the one hand and abuts axially at the end face 62 of housing part 28 on the other hand. Alternatively or in addition to the frictional engagement which is generated between deflection mass carrier 52, i.e., for example, disk 94, and housing part 26 by pressing in, a toothed engagement can also be produced in order to reinforce the corotationally fixed connection, for example, by providing a miniature toothing at the outer circumference of the disk 94 of deflection mass carrier 52, which miniature toothing digs into the material of the housing part 30 which is generally constructed from sheet metal.

Figure 6:
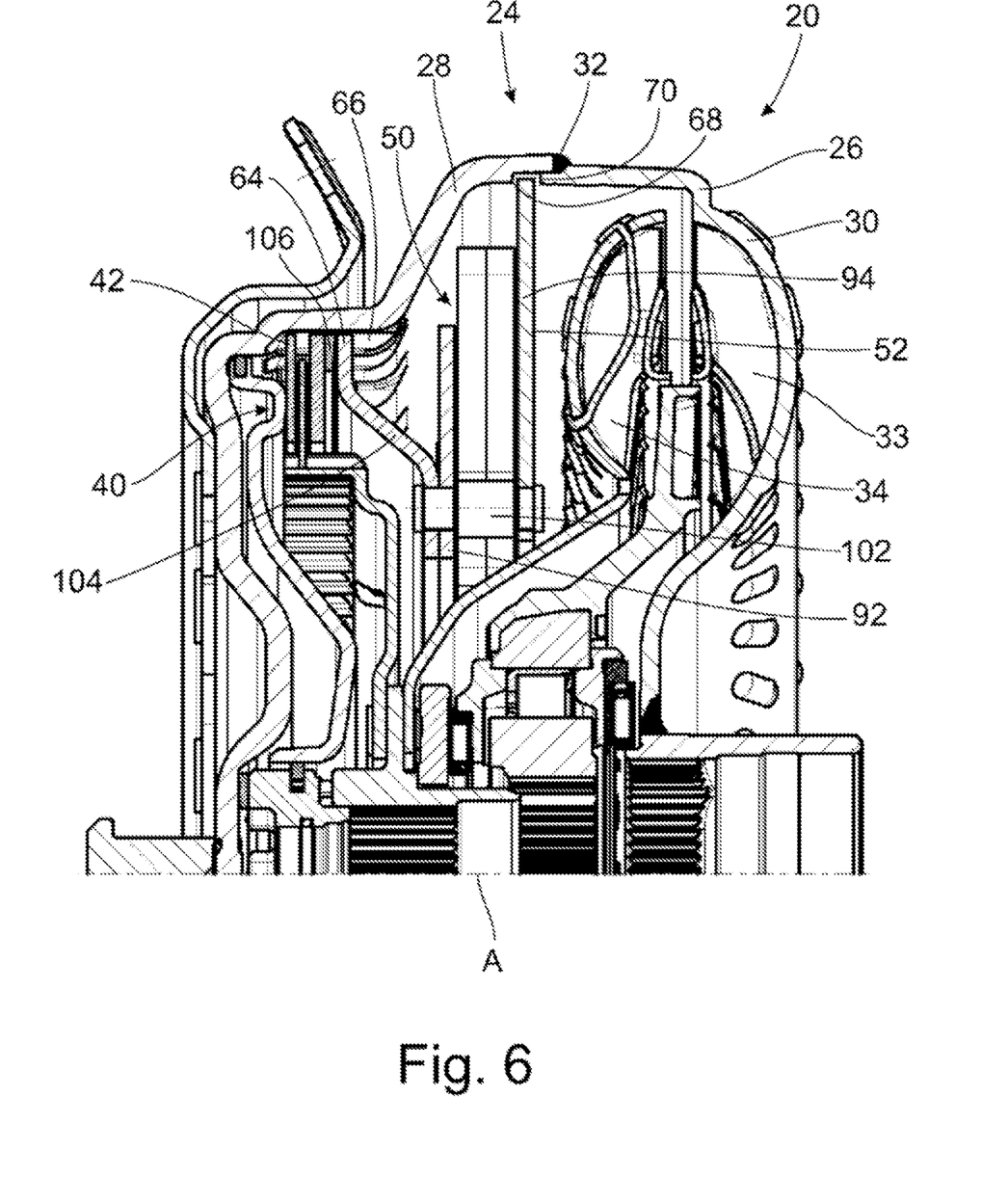
FIG. 6 is a further view corresponding to FIG. 2 of an alternative construction type of a torque transmission assembly.

In the construction type shown in FIG. 6, the deflection mass carrier 52 is constructed in the outer circumferential area of disk 94 for axially fixed positioning of the deflection mass carrier 52. Housing part 28 has a radial step 68 at which the deflection mass carrier 52 axially abuts, or can abut, in direction of housing part 28. In the other axial direction, the deflection mass carrier 52 is axially fixed by an end face 70 of housing part 30. FIG. 6 further shows that an axial hold is achieved in direction toward housing part 28 through the axial support of coupling element 104 at a retaining ring 106 which is fixed as axial abutment for the input-side friction elements 42 at housing part 28 in the area of the toothing 66.

The corotationally fixed coupling to housing 26 is carried out via a coupling element 104, e.g., a disk-shaped coupling element 104, which is fixedly connected to the disks 92, 94 by rivet pins 102 connecting the disks 92, 94 to one another. This coupling element 104 engages in a toothing 66 formed at housing 26 by a toothing 64 formed at coupling element 104. The input-side friction elements 42 are preferably also coupled to housing 26 so as to be fixed with respect to rotation relative to it via toothing 66.

Figure 7:
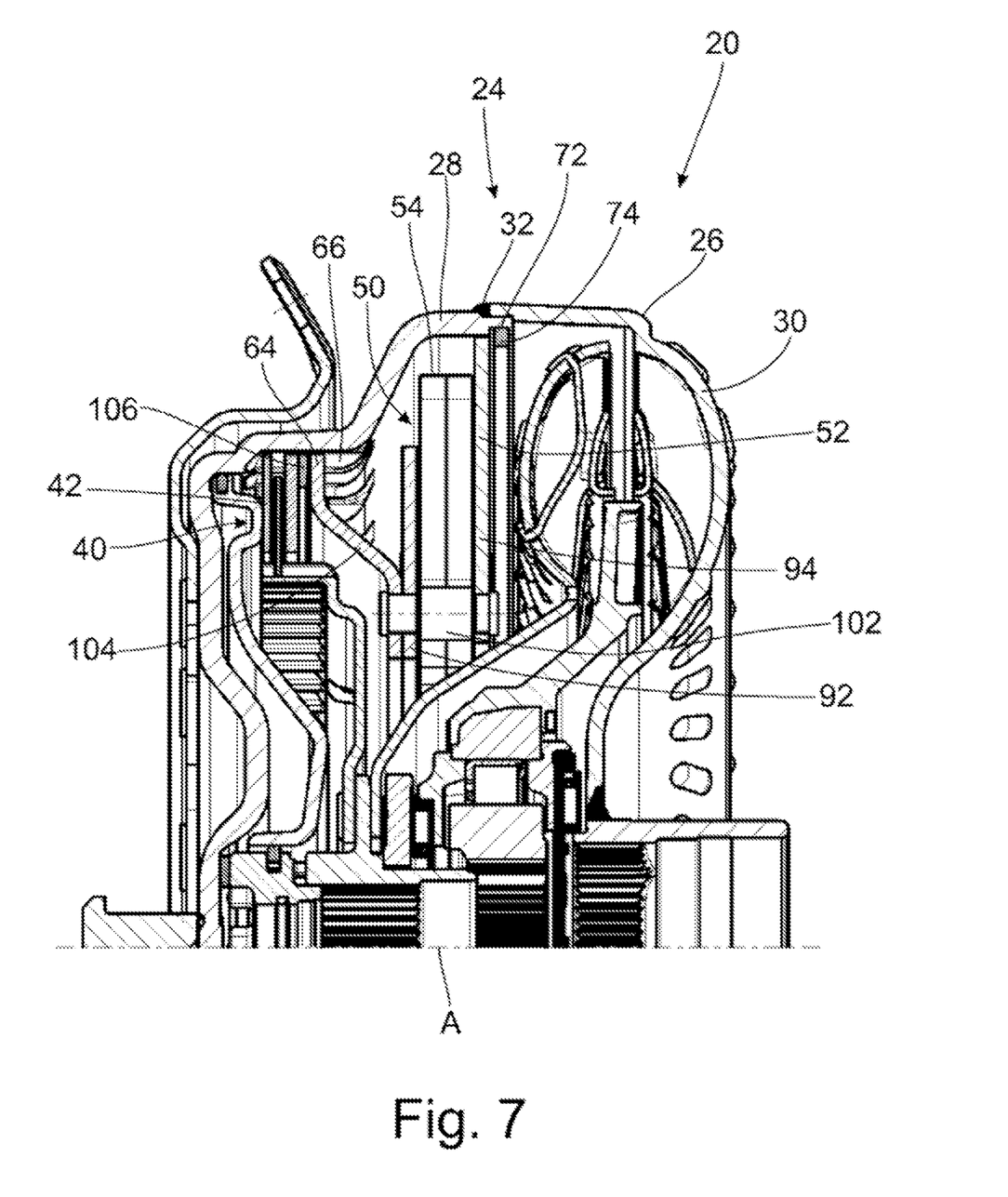
FIG. 7 is a further view corresponding to FIG. 2 of an alternative construction type of a torque transmission assembly.

In the construction type shown in FIG. 7, deflection mass carrier 52 is again coupled for rotation with housing 26 by toothed engagement of the coupling element 104 in its radially outer area with the toothing 66 provided at housing part 28. As was already carried out referring to FIG. 6, an axial hold in direction toward housing part 28 through the axial support of coupling element 104 at a retaining ring 106 which is fixed as axial abutment for the input-side friction elements 42 at housing part 28 in the area of the toothing 66 is also carried out in the solution according to FIG. 7. The deflection mass carrier 52 is axially held in direction of housing part 30 by a retaining ring 74 inserted into housing part 28 in an inner circumferential groove 72 provided therein.

Figure 8:
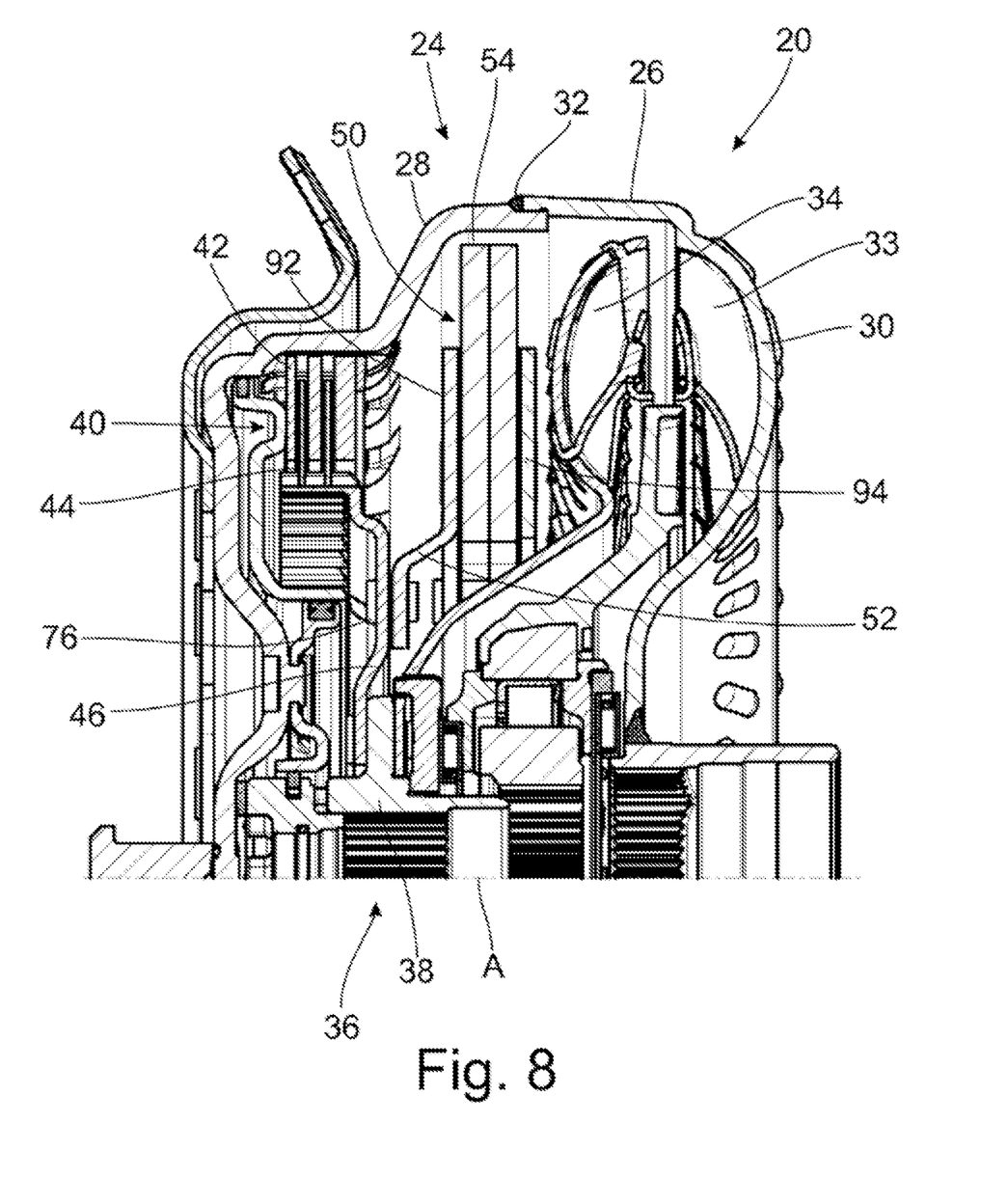
FIG. 8 is a further view corresponding to FIG. 2 of an alternative construction type of a torque transmission assembly.

FIG. 8 shows a construction type in which the deflection mass arrangement 50 is coupled on the output side rather than on the input side with respect to the lockup clutch 40. In the example shown, the deflection mass carrier 52 is coupled by its disk 92, for example, by a plurality of rivet pins 76, to the output-side friction element carrier 46 so as to be fixed with respect to rotation and also axially fixed relative to it so that the deflection mass carrier 52 and, therefore, the deflection mass arrangement 50 are coupled to the output member 36, i.e., hub 38, via the output-side friction element carrier 46.

A construction which can be realized in a simple manner with fewer component parts is provided with the torque transmission arrangement according to the invention because the torque transmission assembly itself only comprises the deflection mass arrangement but not a torsional vibration damper arrangement. Particularly when the deflection mass arrangement is coupled upstream of, i.e., in front of, the lockup clutch 40 in the torque flow with respect to the friction surface arrangements that can be brought into frictional engagement with one another, the lockup clutch which can also be operated in slip mode can be utilized efficiently to provide a damping function without the risk of a detuning of the deflection mass arrangement which, in principle, is tuned to an exciting order of a vibration. By omitting a torsional vibration damper arrangement in the torque transmission assembly, this torque transmission assembly can be constructed compactly and can accordingly contribute to the construction of a drive system which is fundamentally compact and which provides a good torsional vibration damping characteristic at the same time.

In conclusion, it should be noted that a torque transmission assembly of this kind need not necessarily be constructed as a hydrodynamic torque converter. A construction as wet clutch arrangement in which the housing is filled with a fluid, for example, oil, similarly as in a hydrodynamic torque converter and in which input-side friction elements and output-side friction elements are alternately arranged and can be pressed together for the transmission of torque similarly as in a hydrodynamic torque converter, is also possible while retaining the principles of the invention, i.e., providing only a deflection mass arrangement and/or a deflection mass arrangement which is preferably coupled on the input side with respect to the friction surface arrangements to be brought into frictional engagement with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torque transmission assembly for a drive system of a vehicle, comprising:

a housing that comprises at least two housing parts connected to one another;
an input-side friction surface arrangement coupled to the housing for corotation around a rotational axis (A),
an output-side friction surface arrangement coupled to an output member for corotation around the rotational axis (A) and constructed to be brought into frictional engagement with the input-side friction surface arrangement;
a deflection mass arrangement including a deflection mass carrier and at least one deflection mass supported at the deflection mass carrier and constructed to be deflected from a basic relative position with respect to the deflection mass carrier;
wherein the torque transmission assembly is configured such that at least one of:
the deflection mass carrier is connected to the two housing parts in an area where the two housing parts adjoin one another.

2. The torque transmission assembly according to claim 1, wherein the deflection mass carrier is connected to one of the housing parts so as to be fixed with respect to rotation relative to the housing part, and/or wherein the deflection mass carrier is connected to the housing so as to be fixed with respect to rotation and/or axially fixed relative to the housing in the area where the two housing parts adjoin one another, and/or wherein the deflection mass carrier is arranged in the interior of the housing.

3. The torque transmission assembly according to claim 2, wherein the deflection mass carrier is connected to the housing so as to be fixed with respect to rotation relative to the housing by riveting, and/or wherein the deflection mass carrier is connected to the housing so as to be fixed with respect to rotation relative to the housing by welding, and/or wherein the deflection mass carrier is connected to the housing so as to be fixed with respect to rotation relative to the housing via a coupling element; wherein the deflection mass carrier is connected to the coupling element so as to be fixed with respect to rotation relative to the coupling element by riveting, and/or wherein the coupling element is connected to the housing so as to be fixed with respect to rotation relative to the housing by welding or toothed engagement, and/or wherein the deflection mass carrier is connected to the housing so as to be fixed with respect to rotation relative to the housing by toothed engagement and/or by pressing in.

4. The torque transmission assembly according to claim 3, wherein the housing comprises two housing parts and the deflection mass carrier is supported in axial direction at an end face of at least one of the two housing parts, the end face being provided in the area where the two housing parts adjoin one another, and/or further comprising a coupling element for coupling the deflection mass carrier to the housing so as to be fixed with respect to rotation relative to one another; the coupling element being supported with respect to the housing in at least one axial direction.

5. The torque transmission assembly according to claim 2, wherein the housing comprises two housing parts and the deflection mass carrier is supported in axial direction at an end face of at least one of the two housing parts, the end face being provided in the area where the two housing parts adjoin one another, and/or further comprising a coupling element for coupling the deflection mass carrier to the housing so as to be fixed with respect to rotation relative to one another; the coupling element being supported with respect to the housing in at least one axial direction.

6. The torque transmission assembly according to claim 1, wherein there is no deflection mass arrangement provided following the friction surface arrangements in the torque flow.

7. The torque transmission assembly according to claim 1, wherein the deflection mass carrier is connected to the output member so as to be fixed with respect to rotation relative to the output member for corotation around the rotational axis (A).

8. The torque transmission assembly according to claim 1, wherein the input-side friction surface arrangement comprises a plurality of input-side friction elements coupled to the housing for corotation around the rotational axis (A); the output-side friction surface arrangement comprises a plurality of output-side friction elements coupled to an output-side friction element carrier for corotation around the rotational axis (A); and further comprising a pressing element for pressing the input-side friction elements and the output-side friction elements against one another.

9. The torque transmission assembly according to claim 1, wherein the torque transmission assembly is a hydrodynamic torque converter comprising an impeller rotatable with the housing around the rotational axis (A); a turbine arranged in the housing and connected to the output member for corotation around the rotational axis (A); and a stator.

10. The torque transmission assembly according to claim 1, wherein the torque transmission assembly is a wet clutch.

11. A drive system comprising:
a dual mass flywheel with a primary side which is to be coupled to, or which is coupled to, a drive unit and with a secondary side which is coupled to the primary side via a damper element arrangement for torque transmission, and a torque transmission assembly according to claim 1, wherein the housing of the torque transmission assembly is coupled to the secondary side of the dual mass flywheel for corotation around the rotational axis (A).

12. The drive system according to claim 11, additionally comprising an electric machine including a stator arrangement and a rotor arrangement coupled to the secondary side of the dual mass flywheel and to the housing of the torque transmission assembly for corotation around the rotational axis (A).

13. The drive system according to claim 12, wherein there is no deflection mass arrangement in the torque flow following the friction surface arrangements of the torque transmission assembly.

14. The drive system according to claim 11, wherein there is no deflection mass arrangement in the torque flow following the friction surface arrangements of the torque transmission assembly.

15. The torque transmission assembly according to claim 1, wherein the deflection mass arrangement is arranged upstream of a lockup clutch in a torque flow.

16. The torque transmission assembly according to claim 1, wherein the deflection mass arrangement is coupled to the housing, in an area in the torque flow upstream of the friction surface arrangements.

17. The torque transmission assembly according to claim 1, wherein the housing part has a radial step at which the deflection mass carrier axially abuts.

18. The torque transmission assembly according to claim 1, wherein the torque transmission assembly is configured such that the deflection mass carrier is connected to the two housing parts so as to be fixed with respect to rotation relative to the housing for corotation around the rotational axis (A).

19. The torque transmission assembly according to claim 18, wherein the torque transmission assembly is configured such that the torque transmission assembly does not comprise a torsional vibration damper arrangement.

* * * * *